Patented Feb. 6, 1951

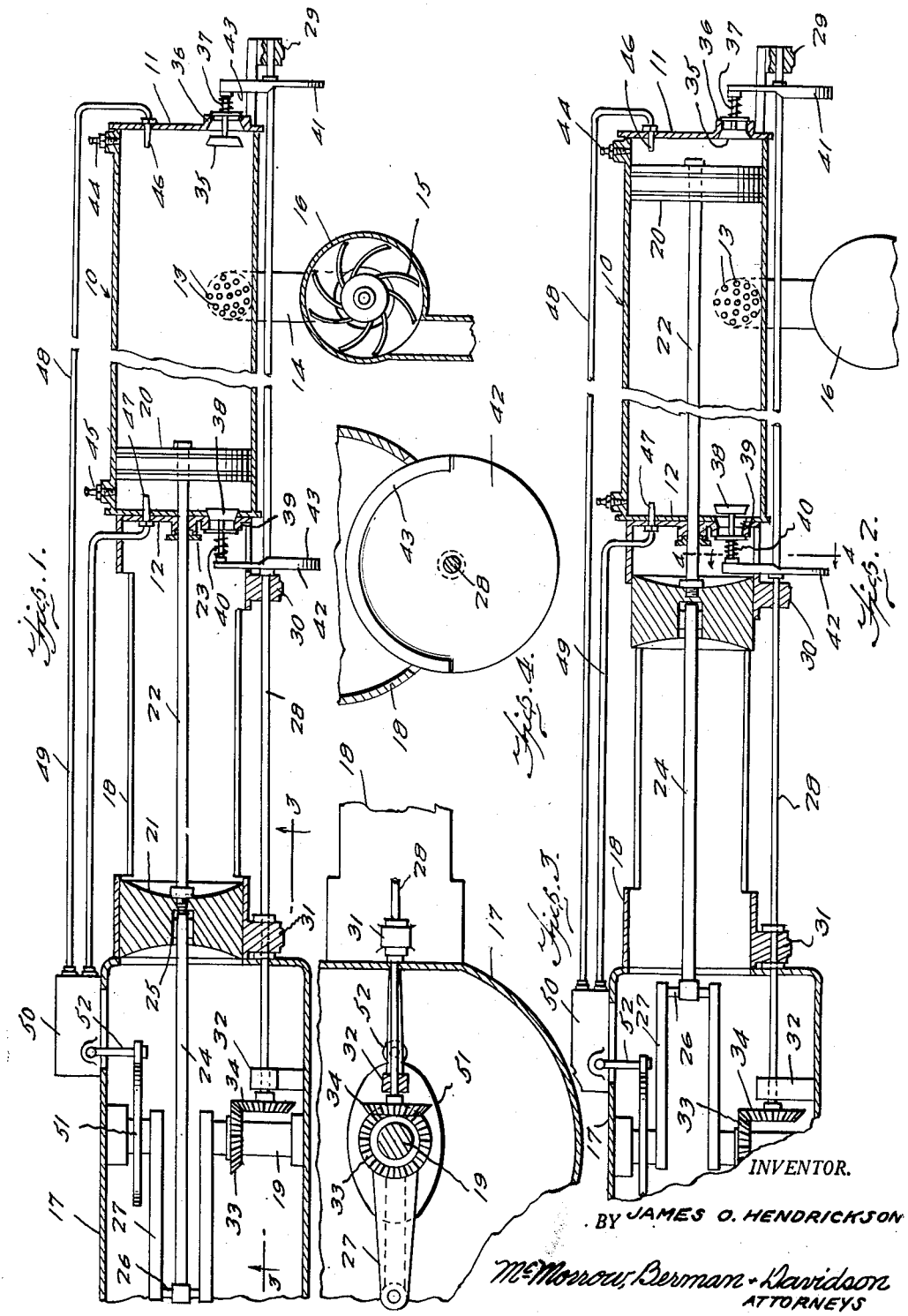

2,540,260

UNITED STATES PATENT OFFICE 2,540,260

INTERNAL-COMBUSTION ENGINE

James O. Hendrickson, Pea Ridge, Ark.

Application December 28, 1948, Serial No. 67,706

1 Claim. (Cl. 123—61)

This invention relates to internal combustion engines, and more particularly to a two-cycle, double-acting engine of improved construction.

It is among the objects of the invention to provide an improved, internal combustion engine which delivers two power strokes for each revolution of the engine crankshaft, thereby greatly increasing the delivered power in proportion to the size and weight of the engine, which provides for the flow of operating gases through the cylinder in the same direction at all times, so there are no sudden temperature reversals with consequent loss in power and efficiency, which provides thorough scavenging of the cylinder after each power stroke, and full compression of the combustion air before ignition, and which is simple in construction and efficient in operation.

Other objects and advantages will become apparent from a consideration of the following description and the appended claim in conjunction with the accompanying drawing, wherein:

Figure 1 is a medial, longitudinal cross-section through an internal combustion engine illustrative of the invention;

Figure 2 is a view similar to Figure 1 showing the moving parts of the engine in a different operative position from that illustrated in Figure 1;

Figure 3 is a longitudinal cross-section of a fragmentary portion of the engine taken substantially on the line 3—3 of Figure 1; and Figure 4 is a transverse cross-section of a fragmentary portion of the engine taken substantially on the line 4—4 of Figure 2.

With continued reference to the drawing, the improved engine has an elongated cylinder 10 provided at its ends with respective cylinder heads 11 and 12. Substantially mid-way between the cylinder heads 11 and 12, the cylinder is provided with a group of apertures 13 which may be arranged in a circular pattern, as illustrated, or in a ring extending around the intermediate portion of the cylinder. In the drawing, the cylinder water jackets and various other conventional structures are omitted for the sake of simplicity in the drawing, but it is to be understood that such conventional features as a cylinder water jacket, water jackets for the cylinder heads, lubricating apparatus, and complete ignition apparatus are to be provided.

An exhaust conduit 14 is connected at one end to the cylinder 10 inclosing the apertures 13, and an exhaust or suction fan 15 is mounted in a fan housing 16 included in the exhaust conduit 14 for drawing exhaust gases out of the cylinder and also moving air from the cylinder intake valves through the cylinder when such valves are open.

A crankcase 17 is spaced from the end of the cylinder provided with the cylinder head 12, and a generally cylindrical, cross-head guide 18 is interposed between the crankcase and the cylinder and connected at one end to the crankcase, and at its opposite end to the cylinder head 12. A crankshaft 19 is journaled in the crankcase.

A piston 20 is reciprocable in the cylinder 10, and a cross-head guide 21 is reciprocable in the cross-head guide 18. A piston rod 22 is connected at one end to the piston 20, and at its opposite end to the cross-head 21, and extends slidably through the center of the cylinder head 12, a packing gland 23 is attached to the cylinder head 12 surrounding the piston rod 22 to prevent leakage of exhaust gas around the piston rod.

A connecting rod 24 is pivotally connected at one end to the cross-head 21 by suitable structure, including the wrist pin 25, and is connected at its opposite end to the crank pin 26 of the crank 27 of the crankshaft 19. With this arrangement, the piston 20 and the cross-head 21 reciprocate in the cylinder 10, and the cross-head guide 18 respectively, as the crankshaft 19 rotates.

A cam shaft 28 extends longitudinally of the cylinder and the cross-head guide from a location within the crankcase 17 to the outer end of the cylinder. This cam shaft is journaled in a journal bracket 29 mounted on the outer end of the cylinder, a pair of spaced-apart journal brackets 30 and 31 mounted on the cross-head guide 18, and a journal bracket 32 mounted within the crankcase 17. A beveled gear 33 is mounted on the crankshaft and meshes with a beveled gear 34 mounted on the end of the cam shaft within the crankcase to drive the cam shaft from the crankshaft. These two gears are of substantially the same size, so that the cam shaft is driven at the same speed as the crankshaft.

An air inlet poppet valve 35 is mounted in the outer cylinder head 11 and resiliently urged to closed position with the valve seat 36 by a coiled compression spring 37. A similar poppet valve 38 is mounted in the cylinder head 12 and resiliently urged into closing relationship with the valve seat 39 by a coiled compression spring 40. A pair of disc cams 41 and 42 is mounted on the cam shaft 28 and are respectively engageable with the stems of the poppet valves 35 and 38 at the outer sides of the respective cylinder heads 11 and 12 to open these valves in timed sequence with the rotation of the crankshaft 19 when the lobe portions 43 of the cams are brought into opposition with the outer ends of the valve stems.

A pair of sparkplugs 44 and 45 is mounted in the cylinder, one near each of the cylinder heads, and these sparkplugs are connected with a suitable electric ignition apparatus, not illustrated.

Respective fuel-injection nozzles 46 and 47 are mounted in the cylinder heads 11 and 12, respectively, to inject fuel into the opposite ends of the cylinder in timed relationship to the rotation of the crankshaft 19, and these nozzles are connected by respective conduits 48 and 49 with a fuel injection pump 50 mounted on the crankcase and operated by a two-lobed cam 51 mounted on the crankshaft 19 and bearing against a roller-equipped operating arm 52 of the fuel pump.

While the fuel pump has been illustrated and described as being mounted on the crankcase and driven from the crank shaft of the engine, it may be mounted in some other convenient location and driven from the engine cam shaft by a suitable gear mechanism without, in any way, exceeding the scope of the invention.

The operation of the improved engine is substantially as follows:

With the piston in the position illustrated in Figure 1, the combustion air will be compressed in the space between the piston and the cylinder head 12. Fuel is now injected into the compressed air through the nozzle 47 and ignited by the sparkplug 45 driving the piston 20 toward the cylinder head 11. As soon as the cylinder head passes the apertures 13, the exhaust gases in the cylinder are exhausted through these apertures, and the exhaust conduit 14. At this time the air inlet valve 38 is opened by the cam 42, and the induction fan 15 in the exhaust conduit draws air through the air inlet valve and the cylinder to completely free the cylinder of exhaust gases, and this scavenging continues until the piston passes the apertures 13 on its return stroke. After passing the apertures 13, the piston compresses the combustion air into the space between the piston and the cylinder head 11, as illustrated in Figure 2, and when this air is fully compressed, fuel is injected through the nozzle 46 and ignited by the sparkplugs 44. This drives the piston back toward the cylinder head 12, and as soon as the piston passes the apertures 13 on its return stroke, the air inlet valve 38 closes, and the piston then compresses the combustion air in the space between the piston and the cylinder head 12, whereupon, the cycle is repeated.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

An internal combustion engine comprising a cylinder having a head at each end, a crankcase spaced from one end of the cylinder, a cross-head guide arranged between the cylinder and crankcase, a reciprocatory piston mounted within the cylinder, a reciprocatory cross-head mounted within the cross-head guide, a piston rod connected at one end to said piston and at its opposite end to said cross-head and extending slidably through the cylinder head adjacent to the cross-head guide, a crankshaft journaled within said crankcase, a connecting rod connecting said cross-head with the crank of said crankshaft, an air inlet valve mounted upon each cylinder head and including an axially extending valve stem projecting beyond the adjacent cylinder head, a rotary cam shaft extending from within said crankcase and longitudinally of and near the side of said cylinder, intermeshing beveled gears on said crankshaft and on said rotary cam shaft within said crankcase for driving the cam shaft from the crankshaft, a pair of generally flat disc cams secured to the rotary cam shaft and projecting laterally thereof adjacent to the free ends of said axially extending valve stems, the disc cams including axially raised arcuate marginal portions which engage the free ends of the axially extending valve stems for unseating the air inlet valves in timed sequence when the cam shaft rotates, the cylinder being provided substantially midway between the cylinder heads with exhaust perforations, an exhaust conduit connected with the cylinder adjacent to the perforations and communicating therewith, an exhaust fan connected in said conduit for drawing exhaust gases out of the cylinder and air into the cylinder from said air inlet valves while such valves are opened, a fuel injection nozzle mounted upon each cylinder head and spaced laterally from the air inlet valve of each cylinder head, a fuel pump driven by the crankshaft and connected with the nozzles for injecting fuel into the cylinder through the nozzles in timed relation to the movements of the piston, and sparkplugs mounted upon the cylinder near each cylinder head and adjacent to each fuel injection nozzle and disposed near the side of the cylinder remote from the air intake valves, the sparkplug serving to ignite the fuel injected into the cylinder by the fuel injection nozzles.

JAMES O. HENDRICKSON.

REFERENCES CITED

The following references are of record in the file of this patent:

UNITED STATES PATENTS

| Number | Name | Date |
|---|---|---|
| 301,320 | Allen | July 1, 1884 |
| 748,959 | Korting | Jan. 5, 1904 |
| 971,919 | Morris | Oct. 4, 1910 |